US010609572B2

(12) United States Patent
Gupta et al.

(10) Patent No.: US 10,609,572 B2
(45) Date of Patent: Mar. 31, 2020

(54) METHODS AND SYSTEMS FOR OPTIMIZING WIRELESS NETWORK PERFORMANCE USING BEHAVIORAL PROFILING OF NETWORK DEVICES

(71) Applicant: Wyebot, Inc., Marlborough, MA (US)

(72) Inventors: Anil Gupta, Shrewsbury, MA (US); Roger D. Sands, Princeton, MA (US); Hien Nguyen, Nortborough, MA (US); Louis E. Pereira, Assonet, MA (US); John S. Balian, Westford, MA (US); David V. Baker, Natick, MA (US)

(73) Assignee: Wyebot, Inc., Marlborough, MA (US)

( * ) Notice: Subject to any disclaimer, the term of this patent is extended or adjusted under 35 U.S.C. 154(b) by 0 days.

(21) Appl. No.: 15/591,326

(22) Filed: May 10, 2017

(65) Prior Publication Data
US 2017/0332256 A1 Nov. 16, 2017

Related U.S. Application Data

(60) Provisional application No. 62/334,176, filed on May 10, 2016.

(51) Int. Cl.
H04W 24/02 (2009.01)
H04L 12/24 (2006.01)
H04L 12/26 (2006.01)

(52) U.S. Cl.
CPC ......... *H04W 24/02* (2013.01); *H04L 41/0631* (2013.01); *H04L 41/147* (2013.01); *H04L 43/08* (2013.01)

(58) Field of Classification Search
CPC .............................. H04W 24/02; H04W 24/20
See application file for complete search history.

(56) References Cited

U.S. PATENT DOCUMENTS

| 6,996,230 | B1* | 2/2006 | Chu ........................ H04B 3/23 370/286 |
| 7,346,359 | B2 | 3/2008 | Damarla et al. |
| 8,830,909 | B1 | 9/2014 | Octeau et al. |
| 2003/0008668 | A1 | 1/2003 | Perez-Breva et al. |
| 2007/0025265 | A1* | 2/2007 | Porras .................. G06K 7/0008 370/252 |
| 2008/0229415 | A1 | 9/2008 | Kapoor et al. |
| 2008/0262990 | A1 | 10/2008 | Kapoor et al. |
| 2009/0180391 | A1 | 7/2009 | Petersen et al. |

(Continued)

FOREIGN PATENT DOCUMENTS

KR 10-2013-0097682 A 9/2013

OTHER PUBLICATIONS

International Search Report and Written Opinion for International Application No. PCT/US2017/031913 dated Sep. 26, 2017.

(Continued)

*Primary Examiner* — Hong S Cho
(74) *Attorney, Agent, or Firm* — Foley Hoag LLP; Rajesh Vallabh

(57) ABSTRACT

Computer-implemented methods and systems are disclosed for optimizing the performance of wireless networks by automatically capturing wireless traffic and other radio frequency (RF) signal data in the network and analyzing the data to identify network anomalies and to determine one or more solutions, without human intervention.

25 Claims, 6 Drawing Sheets

(56) References Cited

U.S. PATENT DOCUMENTS

| | | |
|---|---|---|
| 2011/0171993 A1 | 7/2011 | Kim et al. |
| 2011/0213869 A1 | 9/2011 | Korsunsky et al. |
| 2011/0219035 A1 | 9/2011 | Korsunsky et al. |
| 2011/0231564 A1 | 9/2011 | Korsunsky et al. |
| 2011/0238855 A1 | 9/2011 | Korsunsky et al. |
| 2012/0240185 A1 | 9/2012 | Kapoor et al. |
| 2013/0225209 A1* | 8/2013 | Chen .................. G01S 5/0252 455/456.6 |
| 2015/0033305 A1 | 1/2015 | Shear et al. |
| 2015/0074809 A1 | 3/2015 | Thomas et al. |
| 2015/0349810 A1 | 12/2015 | Baxley et al. |
| 2015/0350902 A1 | 12/2015 | Baxley et al. |
| 2018/0232522 A1* | 8/2018 | Shear .................. H04L 63/0861 |

OTHER PUBLICATIONS

Extended European Search Report for EP application No. EP17796745 dated Oct. 29, 2019.
International Preliminary Report on Patentability for International Application No. PCT/US2017/031913 dated Nov. 13, 2018.

* cited by examiner

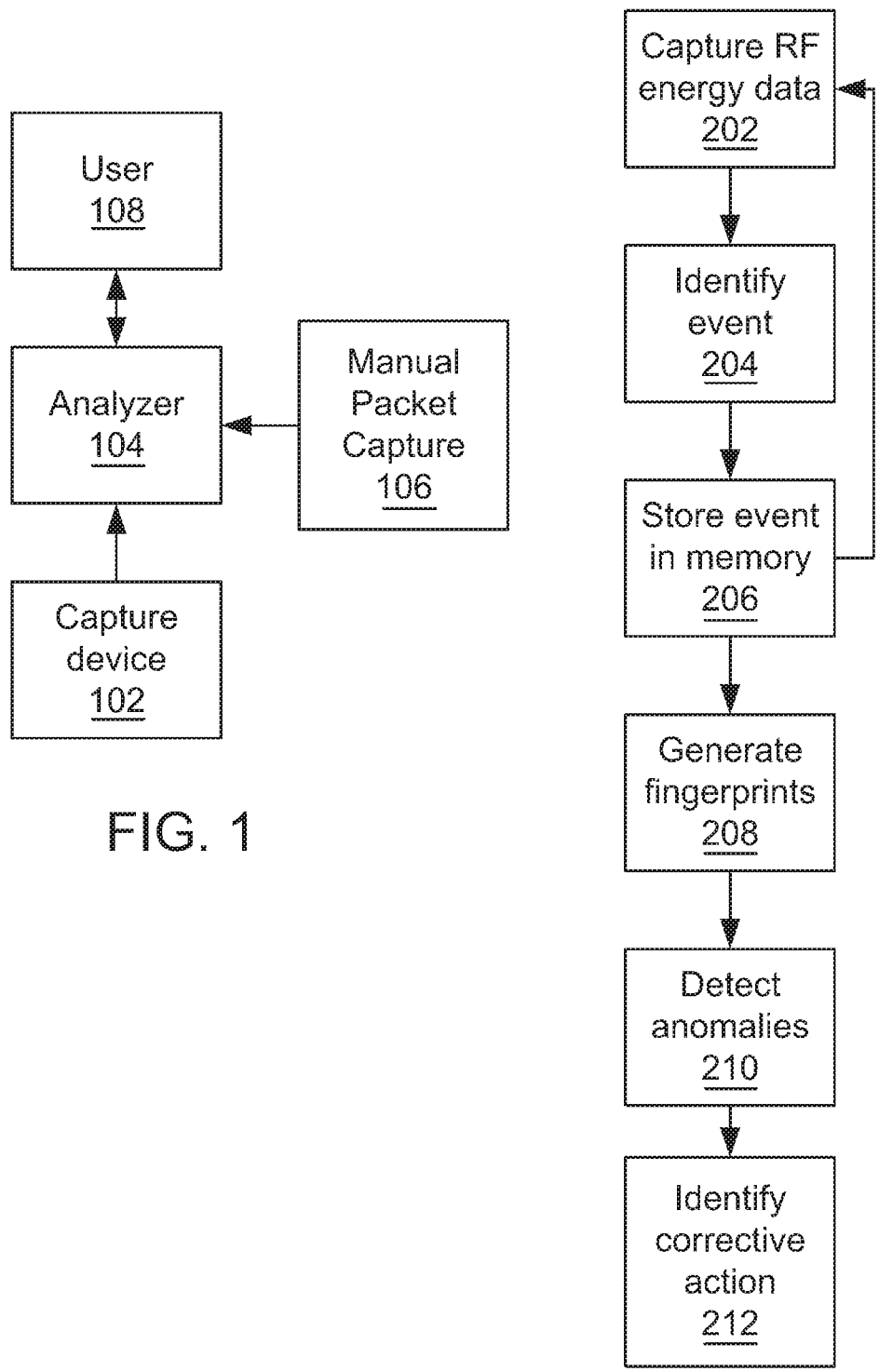

METHODS AND SYSTEMS FOR OPTIMIZING WIRELESS NETWORK PERFORMANCE USING BEHAVIORAL PROFILING OF NETWORK DEVICES

CROSS REFERENCE TO RELATED APPLICATION

This application claims priority from U.S. Provisional Patent Application No. 62/334,176 filed on May 10, 2016 entitled METHODS AND SYSTEMS FOR OPTIMIZING WIRELESS NETWORK PERFORMANCE USING BEHAVIORAL PROFILING OF NETWORK DEVICES, which is hereby incorporated by reference.

BACKGROUND

The present application generally relates to wireless communication networks and, more particularly, to methods and systems for optimizing the performance of wireless networks by automatically or manually capturing wireless traffic and other radio frequency (RF) energy in the network and analyzing the data to identify network anomalies and to determine one or more solutions, without human intervention.

Wireless communication has become the primary and sometimes the only means of connectivity in today's world. Examples of wireless client devices include, but are not limited to, computer laptops, smartphones, tablets, wearable smart devices, smart TVs, IoT devices, and robots. Wireless client devices are also found in automobiles, trucks, autonomous vehicles, and drones. Wireless infrastructure devices include, but are not limited to, wireless access points, and base stations. Many enterprises rely on optimal performance of wireless networks. Network performance can be characterized by many attributes, including but not limited to, connectivity, throughput, responsiveness, retry percentage, coverage, signal strength, and percentage utilization of the wireless spectrum across multiple wireless technologies. For example, the same wireless spectrum can be shared by both Wi-Fi and LTE protocols, cordless phones, Bluetooth, baby monitors and garage openers. Poor network performance can cause loss of revenue, loss of productivity, and end-user frustration, among other problems. Hence, it has become extremely important that wireless networks perform optimally. However, there are many factors that can lead to a poor wireless experience including, but not limited to, poor wireless network design, network congestion, non-compliance to continuously evolving standards, bugs in software or hardware, incompatibility among devices, old devices operating at low speeds, multiple wireless frequency bands, RF interference from non-network devices (e.g., microwave ovens, cordless phones, and baby monitors), and multiple wireless modulation techniques.

Tuning such a network to perform optimally requires extensive technical knowledge and expertise, along with sophisticated tools. Moreover, due to the continuously changing nature of wireless communication, some problems may happen randomly. Hence, it is important that a human being having the knowledge and required expertise be available while the problem happens, which further increases the difficulty in optimizing performance.

BRIEF SUMMARY OF THE DISCLOSURE

In accordance with one or more embodiments, a computer-implemented method is disclosed for optimizing performance of a wireless network. The wireless network includes one or more wireless infrastructure devices providing a network service and one or more client devices consuming a network service. The method comprises the steps of: (a) capturing radio frequency (RF) signal data in the network at a given time instance; (b) analyzing the RF signal data captured in (a) to identify an event for the given time instance for at least one of: (i) the one or more wireless infrastructure devices, (ii) the one or more client devices, and (iii) the RF environment of the wireless network; (c) storing each event identified in (b) in a memory; (d) repeating (a), (b), and (c) for a plurality of time instances; (e) using an event stored in the memory or correlating a set of events stored in the memory over a period of time to generate one or more fingerprints for each wireless infrastructure device, each client device, or the wireless network; (f) analyzing the fingerprints generated in (e) to detect anomalies in the network, wherein analyzing the fingerprints comprises at least one of: (i) comparing corresponding fingerprints taken at different time instances and/or locations to detect differences in network behavior, (ii) comparing the fingerprints to a given reference fingerprint to detect variance from the reference fingerprint, and (iii) correlating two or more fingerprints of client devices or wireless infrastructure devices to identify a condition producing a given behavior; and (g) determining a corrective action to reduce the anomalies or deficiencies detected in (f).

In accordance with one or more further embodiments, a computer system is disclosed for optimizing performance of a wireless network. The wireless network includes one or more wireless infrastructure devices providing a network service and one or more client devices consuming a network service. The system includes an analyzer unit comprising at least one processor, memory associated with the at least one processor, and a program supported in the memory for analyzing fingerprints of one or more wireless infrastructure devices, one or more client devices, or the wireless network. The program contains a plurality of instructions which, when executed by the at least one processor, cause the at least one processor to (a) analyze the fingerprints to detect anomalies in the network, wherein analyzing the fingerprints comprises at least one of: (i) comparing corresponding fingerprints taken at different time instances and/or locations to detect differences in network behavior, (ii) comparing the fingerprints to a given reference fingerprint to detect variance from the reference fingerprint, and (iii) correlating two or more fingerprints of client devices or wireless infrastructure devices to identify a condition producing a given behavior, and (b) determine a corrective action to reduce the anomalies or deficiencies detected in (a).

In accordance with one or more further embodiments, a computer-implemented method is disclosed for collecting data in a wireless network to be analyzed for optimizing network performance. The wireless network includes one or more wireless infrastructure devices providing a network service and one or more client devices consuming a network service. The method includes the steps of: (a) capturing a stream of radio frequency (RF) signal data in the network for the one or more wireless infrastructure devices and the one or more client devices; (b) dividing each stream of RF signal data by time into periodic intervals per location; (c) converting the divided RF signal data into events of interest, each event of interest defined by attributes including at least the time when the event happened and a unique identifier of a wireless infrastructure device and/or a client device generating the event; (d) repeating (a), (b), and (c) a plurality of times; (e) detecting a change in an event of interest from a wireless infrastructure device and/or a client device; and (f) providing the change in the event of interest detected in (e) to an analyzer for identifying anomalies in the network.

In accordance with one or more further embodiments, a computer system is disclosed for collecting data in a wireless network to be analyzed for optimizing network performance. The wireless network includes one or more wireless infrastructure devices providing a network service and one or more client devices consuming a network service. The system includes one or more radios for capturing a stream of radio frequency (RF) signal data in the network for the one or more wireless infrastructure devices and the one or more client devices. The system also includes at least one processor, memory associated with the at least one processor, and a program supported in the memory. The program contains a plurality of instructions which, when executed by the at least one processor, cause the at least one processor to: (a) divide each stream of RF signal data by time into periodic intervals per location; (b) convert the divided RF signal data into events of interest, each event of interest defined by attributes including at least the time when the event happened and a unique identifier of a wireless infrastructure device and/or a client device generating the event; (c) repeat (a) and (b) a plurality of times for captured RF streams; (d) detect a change in an event of interest from a wireless infrastructure device and/or a client device; and (e) provide the change in the event of interest detected in (d) to an analyzer for identifying anomalies in the network.

In accordance with one or more further embodiments, a computer-implemented method is disclosed for processing data collected in a wireless network for identifying anomalies in the network. The method includes the steps of: (a) receiving the data collected in a wireless network from one or more capture devices, the data being in a structured format; (b) storing the data received in (a) in a relational database management system (RDBMS); (c) accessing the data stored in the RDBMS in real time by an application for analyzing the data and identifying anomalies in the network; and (d) outputting information on anomalies identified in (c) to a user. In accordance with one or more embodiments, the method further includes periodically pruning data in the RDBMS, and storing the pruned data in a long-term storage system.

BRIEF DESCRIPTION OF THE DRAWINGS

FIG. 1 is a block diagram illustrating an exemplary network optimization system in accordance with one or more embodiments.

FIG. 2 is a flowchart illustrating an exemplary network optimization process in accordance with one or more embodiments.

DETAILED DESCRIPTION

Figure 3:
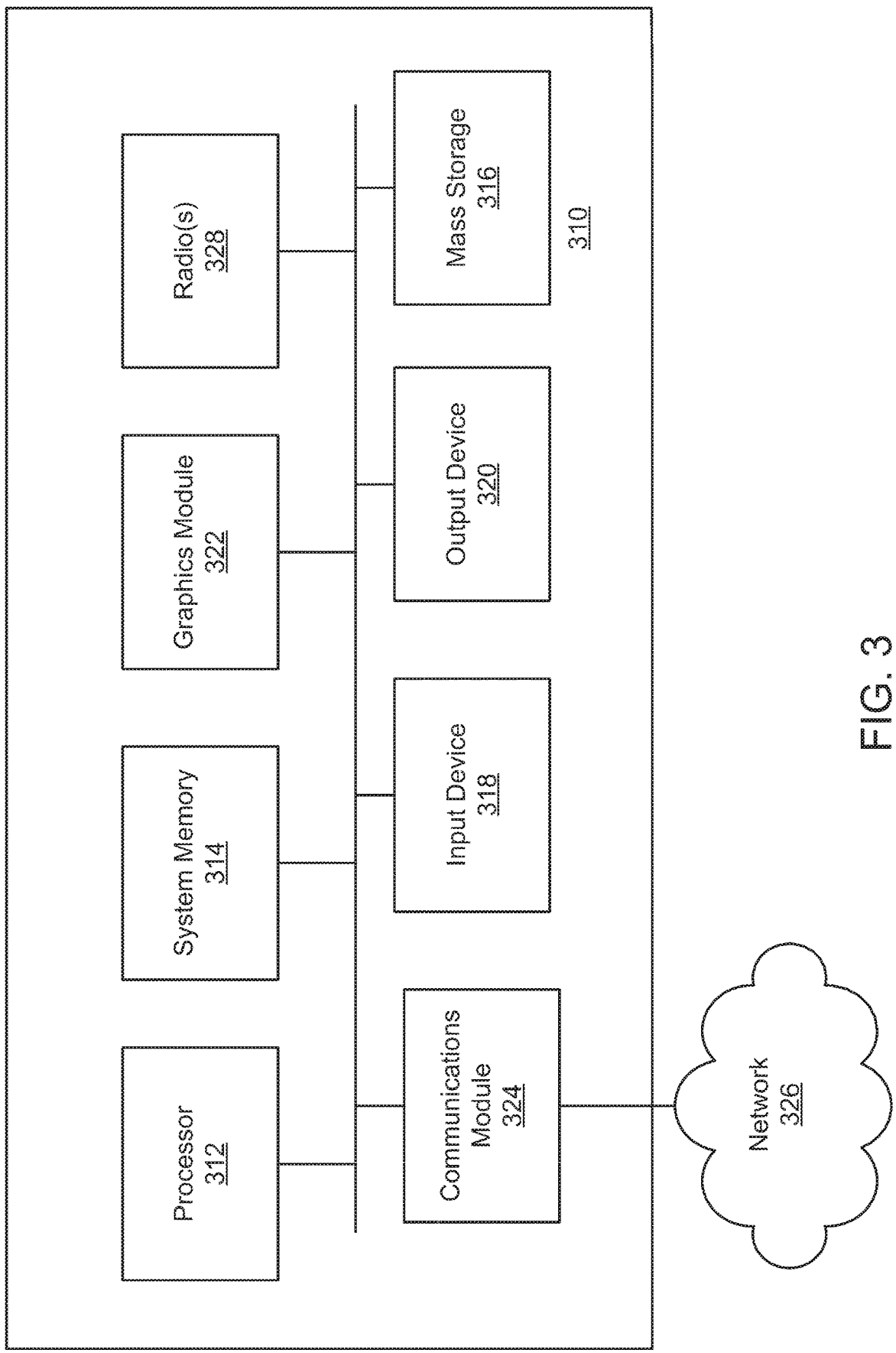
FIG. 3 is a simplified block diagram illustrating a representative computer system in accordance with one or more embodiments in which a network optimization process may be implemented.

Various embodiments disclosed herein relate to methods and systems for optimizing the performance of a wireless network by detecting network anomalies and deficiencies using behavioral profiling (also referred to herein as fingerprinting) of network devices, as well as RF behavior in the network. Both types of network devices are profiled: those that provide a network service (e.g., infrastructure devices such as wireless access points or routers) and those that consume a network service (e.g., user or client devices such as laptops, smartphones, tablets, wearable smart devices, and smart TVs).

Examples of wireless networks that can be analyzed and optimized in accordance with various embodiments include, but are not limited to, Wi-Fi (IEEE 802.11), Bluetooth (IEEE 802.15.1), ZigBee (IEEE 802.15.4), LTE, and LTE-U networks.

The wireless network may be made up of network devices sharing the same wireless frequency band, using the same or different modulation techniques to transmit or receive data.

Methods and systems in accordance with various embodiments can be used to optimize the performance of wireless networks in any location, including advantageously where human expertise is not readily available to troubleshoot and diagnose performance issues. Examples include, but are not limited to, remote branch offices of enterprises, large enterprises, hospitals, hotels, etc.

As used herein, the terms "optimize" and "optimizing" mean improve and improving, respectively. The terms do not necessarily mean the objectively single best solution, but rather a better or improved solution to a particular network problem.

FIG. 1 illustrates an exemplary network optimization system in accordance with one or more embodiments. The system includes a capture device 102 and an analyzer 104, and optionally a manual packet capture mode 106. The analyzer 104 may comprise analyzer software running on a computer system. The capture device 102 is configured to capture wireless traffic and other RF signal data within a wireless network in an enterprise. Manual packet capture can be done generally using any device that is capable of capturing wireless traffic, as long as data is stored in a format (or can be converted to a format) that is acceptable by the analyzer 104.

In accordance with one or more embodiments, the capture device 102 includes multiple wireless radios that allow capturing wireless data on multiple radio frequencies at the same time. In some embodiments, the capture device 102 can strip-off and discard user-sensitive information from the captured data, and thereafter store the remaining data locally or in the cloud. In alternate embodiments, all the captured data is stored locally or in the cloud.

The capture device 102 feeds captured data into the analyzer 104, which creates profiles of the network devices over a period of time. The analyzer 104 then compares the most recent profile of a device against other local profiles created in the past, and/or from other enterprises. A local profile is one that is created for a location A, whereas a remote profile is one that is created for a different location B. The analyzer 104 detects differences in network behavior of infrastructure devices or user devices, and presents one or more solutions to remedy the problem. The analyzer 104 may also compare a device profile against known good profiles, historical profiles within the same enterprise, profiles created across multiple enterprises, and industry-recommended best practice profiles, among others.

In one or more embodiments, the analyzer 104 co-exists on premise with the capture device 102. In one or more embodiments, the analyzer 104 and capture device 102 are implemented in a single device. In one or more alternate embodiments, the analyzer 104 can run remotely in the cloud as a software application.

In accordance with one or more embodiments, the system only analyzes and stores wireless packet headers of the wireless traffic in the network. The rest of the traffic data is discarded to maintain user privacy. In other embodiments, the system analyzes all data captured in the network.

An RF environment profile of a network can include many different components. Examples of such components include, but are not limited to, (1) number of channels (wireless frequency) being used, (2) number of clients associated to a specific wireless radio, (3) interference on a given frequency band—Interference can come from multiple sources like Bluetooth devices, microwave ovens, baby monitors, cordless phones and many more, (4) client distribution across different frequency bands (e.g., 2.4 GHz and 5 GHz), (5) the base noise floor level in a given environment, (6) network congestion, (7) network throughput, (8) number of retry frames, (9) number of transmit and/or receive errors, and (10) channel utilization. A change in the RF behavioral profile indicates that something has changed in the network. By comparing the characteristics of old and new profiles, the system can determine the cause of a change in network performance.

A fingerprint comprises one or more wirelessly detectable attributes (or an ordering of multiple wirelessly detectable attributes) of a network, a device in the network (infrastructure device or end-user device), the RF environment of the network, or a combination thereof.

Examples of information that may be part of a network device fingerprint include, but are not limited to: (1) channels and/or frequency bands supported, (2) year, make, and model, (3) software version, (4) wireless protocols supported, (5) list of Information elements included in a wireless packet, (6) order of information elements within a wireless packet, (7) inter-packet timing for management, control, and data frames, (8) inter-operability behavior with a specific manufacturer's wireless client device or infrastructure device, (9) names of networks that a wireless infrastructure device advertises, (10) security profiles of networks that a wireless infrastructure advertises, (11) interoperability behavior across different wireless technologies, and (12) wireless access point transmit power. Using information like in the examples above, it is possible to create a unique fingerprint for each device ever seen on the network.

Examples of information that may be part of a client device fingerprint include, but are not limited to: (1) channels and/or frequency bands supported, (2) year, make, and model, (3) software version, (4) wireless protocols supported, (5) list of Information elements included in a wireless packet, (6) order of information elements within a wireless packet, (7) inter-packet timing for management, control, and data frames, (8) inter-operability behavior with a specific manufacturer's wireless infrastructure device, (9) pattern of times of day/month/year at which the client device connects to the wireless infrastructure devices, (10) pattern of locations at which the client device connects to the wireless infrastructure devices, (11) pattern of roaming across different wireless technologies, (12) interoperability behavior across different wireless technologies, (13) device transmit power, and (14) usage patterns.

A network fingerprint may include parameters like, but not limited to, (1) number of wireless clients, (2) number of access points, (3) network throughput, (4) wireless device airtime, (5) wireless frame retry percentage, (6) wireless frame signal to noise (SNR) ratio, (7) transmit frame error rate, (8) receive frame error rate, (9) spectrum analysis information, (10) wireless radio hardware error interrupts, (11) wireless radio weather radar detection interrupts, and (12) network response times.

A fingerprint can be compared to a pre-defined reference standard and actions can be taken based on the result of the comparison.

Fingerprints characterize the behavior of the environment or a device (infrastructure or end-user wireless device). Signatures describe a specific combination of conditions, which when met, produce a specific behavior. For example, when a specific device manufactured by vendor 'A' connects to a wireless access point manufactured by vendor 'B', AND the Access Point is advertising a certain capability (e.g., Protected Management Frames—PMF), wireless performance throughput may drop drastically. This signature thus represents a specific combination of particular client and access point device behavior.

In accordance with one or more embodiments, numerical scores may also be associated with each signature. The scores can indicate, e.g., how many times a specific signature is hit within the same enterprise or across enterprises, or across different industry verticals, examples of which may include, but are not limited to, hospitality, education, retail, small to medium businesses, and more.

Fingerprints of network elements may be stored in the analyzer 104 or, alternately, remotely, e.g., in the cloud, where information from multiple enterprises can be correlated using various machine-learning methods and other techniques.

The analyzer 104 can detect situations where the first time fingerprint of a network differs significantly from reference network performance fingerprints. Once the network is stable, the analyzer 104 can always detect if the network's fingerprint has changed. There could be many reasons for such a change. These include, but are not limited to, a change in wireless driver software on end-user devices (e.g., software upgrade pushed by a device manufacturer), new devices introduced in the network, a change in device behavior due to standards evolution, introduction of an RF interfering source, and many more.

The analyzer 104 is also able to correlate information across multiple enterprises, without sharing any customer-specific information. Examples of such information include, but are not limited to: (1) number of clients per 802.11 wireless access point (AP) that work reliably, (2) device manufacturers and software versions that interoperate with each other well, (3) percentage of retry packets that is acceptable for reliable performance, and (4) number of wireless SSIDs that is acceptable for reliable performance. The analyzer 104 can also learn about optimal AP location based on a given client population distribution in a wireless network. The analyzer 104 can also determine the optimal cell size for each AP given various frequencies and connection rates. This information can be learned and shared across multiple enterprises.

The analyzer 104, using machine-learning methods or other techniques, may automatically create new signatures as it observes similar behaviors across multiple enterprise networks.

Once fingerprints and/or signatures are developed and correlated across multiple enterprises, the analyzer 104 makes recommendations as to how problems can be resolved. As one simple example, the analyzer 104 detects that a "Device A" in the network is a very old device, and is adversely impacting performance for all the other devices. The analyzer 104 recommends that network operator remove Device A or upgrade it. As another example, the analyzer 104 determines and recommends that the settings of an Access Point be changed, so that clients will perform better. As another example, the analyzer 104 determines that there are too many wireless clients connected to a specific access point (AP), and recommends that the operator add another AP. As another example, the analyzer 104 determines that there are too many clients connecting on the 2.4 GHz band, and recommends changing the ratio of 5 GHz clients to 2.4 GHz clients to 75/25 (i.e., 75% clients on 5 GHz and 25% clients on 2.4 GHz).

Network optimization systems in accordance with one or more embodiments do not require extensive expertise to use, and can be deployed to any location where there is limited IT staff, e.g., in remote branch office locations, manufacturing facilities, hospitals, and hotels. Additionally, the systems can be configured to run continuously, and thereby capture useful information at the exact time the problem(s) occur, and provide 24×7 performance monitoring and resolution of wireless network performance.

When the capture device 102 is placed in a customer environment for the first time, network fingerprints are captured for every infrastructure and end-user device. These fingerprints are then saved in a long-term database, so that any changes to the network health can be detected.

In accordance with one or more embodiments, the analyzer 104 stores historical fingerprints for each location in a long term database. Hence, it has the ability to detect changes within the same location.

FIG. 2 is a flowchart generally illustrating an exemplary process for optimizing performance in a wireless network in accordance with one or more embodiments.

At step 202, radio frequency (RF) signal data in the network is captured at a given time instance.

At step 204, the captured RF signal data is analyzed to identify an event for the given time instance for wireless infrastructure devices, client devices, and/or the RF environment of the wireless network.

At step 206, each event is stored in a memory.

Steps 202, 204, and 206 are repeated for multiple time instances.

At step 208, one or more fingerprints are generated for wireless infrastructure devices, client devices, and/or the wireless network. The events are based on a single event stored in the memory or a set of events correlated over a period of time.

At step 210, the fingerprints are analyzed to detect anomalies in the network. The analysis is done by comparing corresponding fingerprints taken at different time instances to detect differences in network behavior and/or comparing the fingerprints to a given reference to detect variance from the standard.

At step 212, a corrective action is identified to reduce and/or eliminate the anomalies or deficiencies.

The methods, operations, modules, and systems described herein may be implemented in one or more computer programs executing on a programmable computer system. FIG. 3 is a simplified block diagram illustrating an exemplary computer system 310, on which the computer programs may operate as a set of computer instructions. In this exemplary embodiment, the capture device 102 and the analyzer 104 are implemented in the computer system 310. (In other exemplary embodiments, the capture device 102 and the analyzer 104 are implemented in separate devices, each with suitable memory and processing and other capabilities.) The computer system 310 includes at least one computer processor 312, system memory 314 (including a random access memory and a read-only memory) readable by the processor 312. The computer system 310 also includes a mass storage device 316 (e.g., a hard disk drive, a solid-state storage device, an optical disk device, etc.). The computer processor 312 is capable of processing instructions stored in the system memory 314 or mass storage device 316. The computer system 310 additionally includes input/output devices 318, 320 (e.g., a touch screen display, keypad, etc.), a graphics module 322 for generating graphical objects, and one or more radios 328 to capture wireless data on multiple radio frequency bands and different modulation techniques. Examples of different types of radios include, but are not limited to, 802.11 Wi-Fi radios, Bluetooth, wireless spectrum analysis, 4G LTE, 5G, ZigBee and many more. The system 310 also includes a communication module or network interface 324, which manages communication with other devices such as an analyzer 104 for remote analysis via telecommunications and other networks 326. The system 310 preferably communicates with the network 326 through an Ethernet or other wired connection, through a Wi-Fi or other wireless connection is also possible.

Each computer program can be a set of instructions or program code in a code module resident in the random access memory of the computer system. Until required by the computer system, the set of instructions may be stored in the mass storage device or on another computer system and downloaded via the Internet or other network.

Capture Device

Figure 4A:
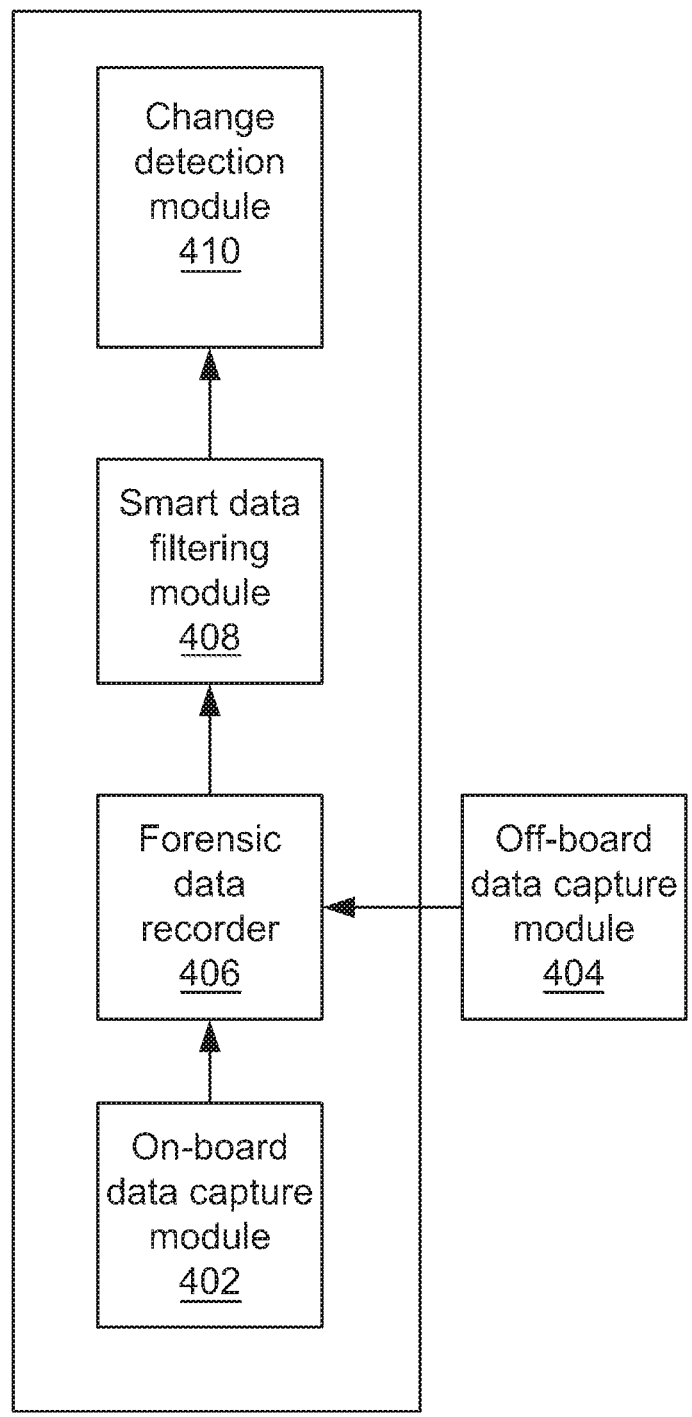
FIGS. 4A and 4B are simplified block diagrams illustrating exemplary capture devices in accordance with one or more embodiments.
Figure 4B:
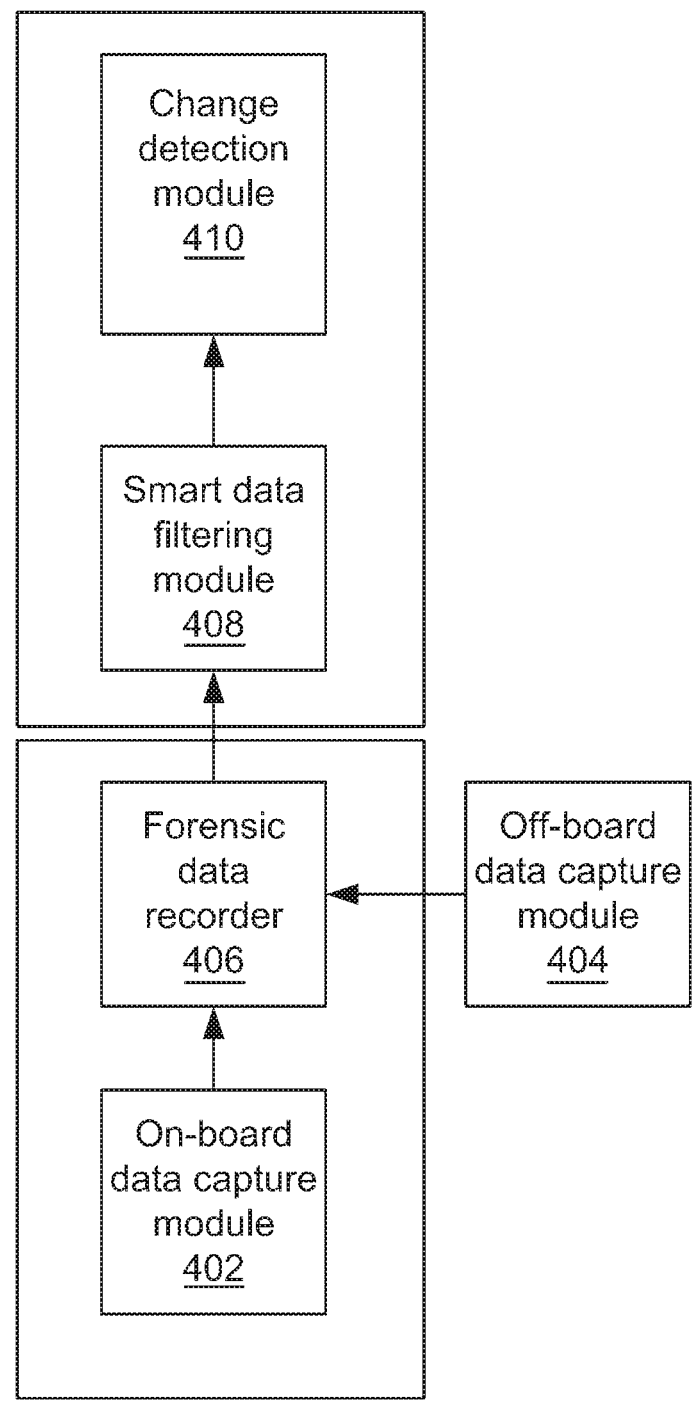

FIGS. 4A and 4B illustrate exemplary capture devices in accordance with one or more embodiments, which provide data to a separate analyzer (not shown). The FIG. 4A device integrates a data capture module 402, a forensic data recorder 406, a smart data filtering unit 408, and a change detection module 410 in a single device. The FIG. 4B embodiment includes two separate devices: one device containing the data capture module 402 and the forensic data recorder 406, and the other device containing the smart data filtering unit 408 and the change detection unit 410.

The capture device can capture wireless traffic and other RF signal data using the on-board capture device 402. Alternatively (or in addition), the capture device can receive wireless traffic and other RF signal data from an off-board capture device 404.

The on-board capture device streams captured data over a local memory bus to a forensic data recorder module 406 of the capture device. The stream of data is in a format mutually agreed upon between the on-board data collector 402 and the data recorder 406. The stream of data can be used for offline forensic analysis and/or troubleshoot network issues. The stream of data comprises a high volume of raw data coming at very high velocity.

The off-board capture device 404 streams data over the wired or wireless infrastructure to the forensic data recorder module 406 of the capture device. As with data from the on-board data collector 402, the stream of data from the off-board data collector 404 is in a format mutually agreed upon between the off-board data collector 404 and the data recorder 406. The stream of data from the off-board data collector 404 is also used for offline forensic analysis and/or troubleshoot network issues. The stream of data comprises a high volume of raw data coming at very high rate.

The forensic data recorder module 406 receives the large volume of raw data coming at a high rate, and divides up the data, by time, into periodic intervals, e.g., 30 second intervals. The divided data is then fed to a smart data filtering module 408.

The Smart Data filtering module 408 converts the raw data into events of interest (EOI). Each event of interest (EOI) is uniquely identifiable via multiple attributes, two of which are always: (i) the time instance at which the event happened (eoi_time) and (ii) a globally unique identifier (GUID) of the integrated capture device of FIG. 4A or the split capture device of FIG. 4B that generated that event. Additional attributes may include, but not limited to, MAC address of the connecting device and/or the device to which a connection is made, type of wireless packet, and connection state. All data is preferably in a structured format and suitable for storage in a conventional relational database, e.g., Postgres SQL.

There can be many types of EOI. Examples of events, include but are not limited to: (1) presence_eoi: these events may include information about presence/absence of clients or infrastructure devices; (2) connection_eoi: these events may include information about the handshake between a client device and an infrastructure device, and whether the handshake was successful or not; (3) stats_eoi: these events represent may include statistics about client and/or infrastructure devices over a period of time; and (4) capability_eoi: these events may include information about the capabilities of clients and infrastructure devices.

Using events of interest creates a manageable number of meaningful events from the large amount of raw data received at high rate. The ratio of event data to the raw data is less than 1/10, and more preferably less than 1/100. The raw data may be discarded immediately after the events have been generated. Alternatively, the raw data may be stored locally for some period of time for forensic analysis at later time.

The smart data filtering module 408 feeds the eoi to a change detection module 410. The change detection module 410 saves a first copy of the capability events of interests (capability_eoi) for each different client and infrastructure device as they come in every periodic interval, e.g., every 30 seconds.

The change detection module 410 compares the capabilities received from each client and/or infrastructure device at a bit-by-bit level with the capabilities it may already have for that client and/or infrastructure device. If the change detection module 410 does not have any set of capabilities for the device, it generates an event of interest with the first set of capabilities. Thereafter, it generates an event of interest every time a change is detected, and also updates its local copy of the capabilities for that client/infrastructure device with the merged capabilities from the first copy and newly received capabilities.

The change detection module 410 continuously updates the local copy of the capability for each client/infrastructure device as the capability set changes, and keeps generating an event each time a change happens. The change detection module 410 does not generate any new event if no change is detected in the capability of a client and/or infrastructure device.

The events of interest are sent from the change detection module 410 to the analyzer 104, which may comprise one or more computer devices in the internet cloud, where events from multiple capture devices 102 are received, and data is analyzed and correlated using various means. Examples can include, but are not limited to, splitting across different industry verticals, times of day, age groups, location, network types, etc.

Big Data Architecture of Analyzer

In accordance with one or more embodiments, an innovative big data processing architecture is used at the analyzer 104 for processing data received from the capture device. The processing architecture allows for near real time processing of the data, enabling end users to be quickly alerted of identified network problems and/or solutions.

Figure 5:
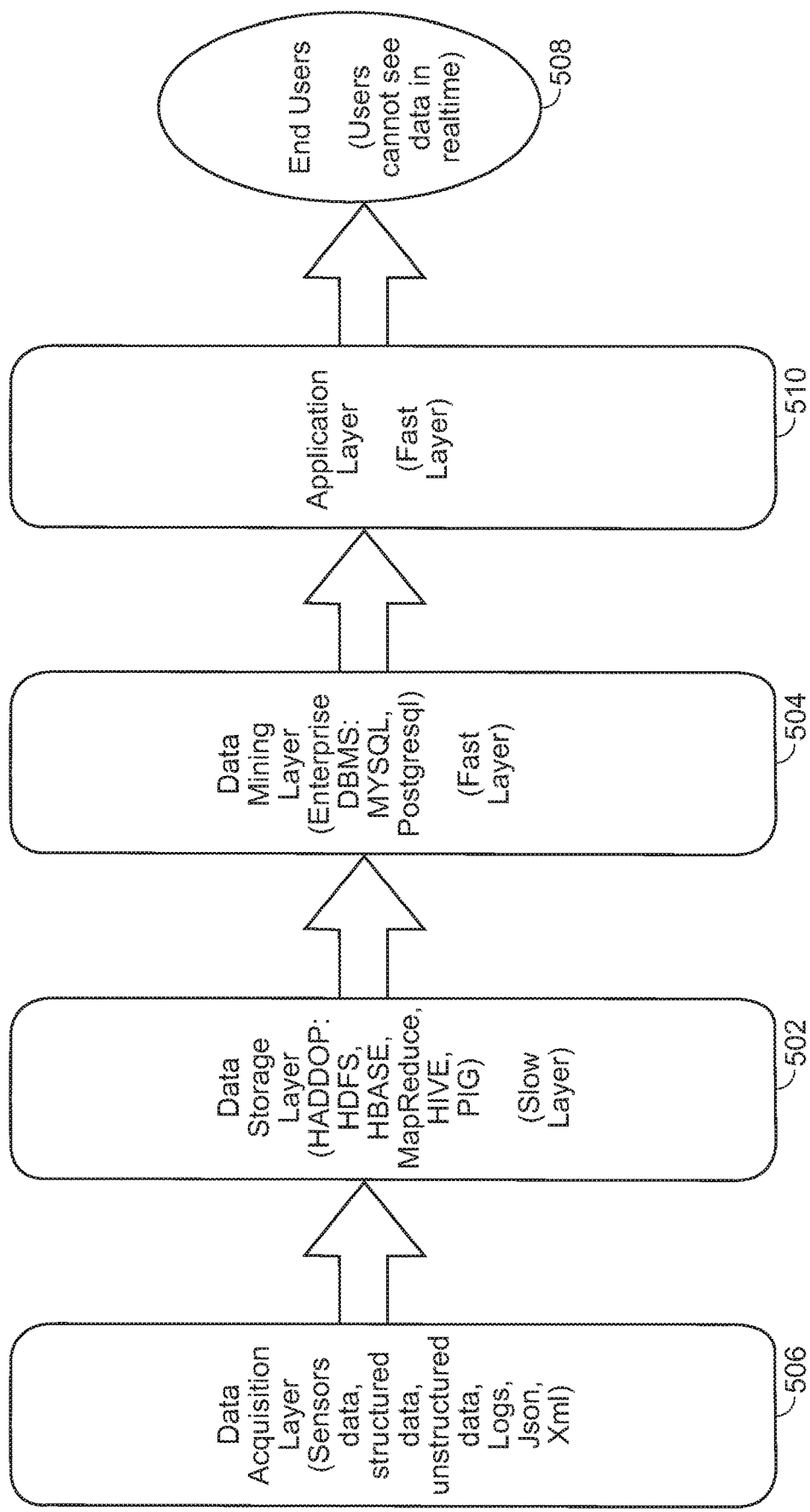
FIG. 5 is a simplified block diagram illustrating a conventional big data system in accordance with the prior art.

FIG. 5 is a simplified illustration of a typical conventional big data system, which includes a very slow data storage layer 502 and data mining layer 504 sandwiched between the real time sensor data 506 and the end users 508. This results in significant delays in processing the data by the application layer 510 and presenting results to the users 508. There could, e.g., be hours of delay, at which time the data may be of little use to the users.

Figure 6:
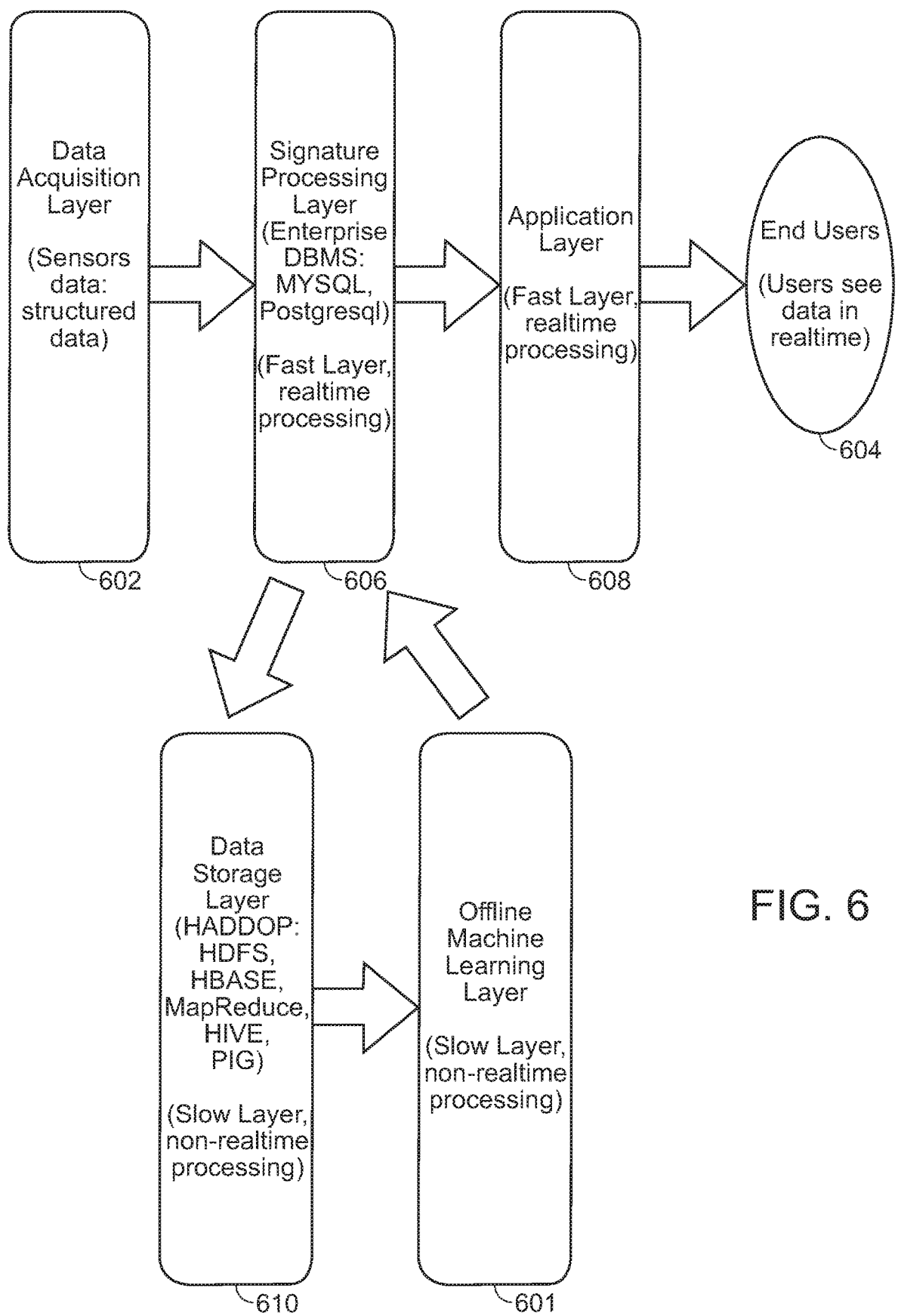
FIG. 6 is a simplified block diagram illustrating a big data system in accordance with one or more embodiments.

FIG. 6 is a simplified illustration of a big data system in accordance with one or more embodiments, which is advantageously suited for real time usage. The system removes the slow data storage layer and the slow data mining layer from the path between data acquisition layer 602 and data presentation to the end users 604. All the acquired data from the real time sensors are provided in a structured format and stored in a fast relational database management system (RDBMS) 606. This allows the application layer 608 to access the data in the RDBMS database 606 just as soon as the data arrives and process it into the output format that can be presented to the end users 604. In this way the delay between the data acquisition layer 602 and end user presentation layer 604 is in terms of seconds instead of hours or days.

Structured data means that data collected is in certain format, where each piece of collected data has the same attributes. For example, for wireless device, one may have the type of device, size of device, technology used by the device. Data is organized into tables, and each row within the table has the same number of columns. There can be multiple tables, each with different number of columns.

In order to keep the RDBMS database 606 fast and nimble, it is regularly pruned to stay within a reasonable size (e.g., 4 TB for Postgresql). The pruned data can be transferred to the slow data storage layer 610 for long term storage and offline machine learning 612.

In the exemplary architecture, the slow data storage layer 610 is shown to be implemented on top of a Hadoop HDFS file system, but the system is not restricted to just the Hadoop system. A variety of other types of slow data storage technology could be used including, e.g., AWS S3, Azure storage, Google cloud storage, etc. The slow offline machine learning layer is fed off of the input from the slow storage layer. It is responsible for identifying new signatures that affect the performance of the wireless network and update a signature database in the signature processing layer.

While the big data architecture embodiment described above is used in the context of processing wireless traffic data, it should be understood that it is not so limited, and may be used in a variety of other applications.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

Accordingly, the foregoing description and attached drawings are by way of example only, and are not intended to be limiting.

The invention claimed is:

1. A computer-implemented method of collecting data in a wireless network to be analyzed for optimizing network performance, said wireless network including one or more known wireless infrastructure devices providing a network service and one or more known client devices consuming a network service, the method comprising the steps of:
   (a) capturing a stream of radio frequency (RF) signal data in the network for said one or more known wireless infrastructure devices and said one or more known client devices;
   (b) dividing each stream of RF signal data by time into periodic intervals per location;
   (c) converting the divided RF signal data into events of interest, each event of interest defined by attributes including at least the time when the event happened and a unique identifier comprising a media control access (MAC) address of a wireless infrastructure device and/or a client device generating the event;
   (d) repeating (a), (b), and (c) a plurality of times;
   (e) detecting a change in one of the events of interest from a known wireless infrastructure device and/or a known client device; and
   (f) providing the change in the event of interest detected in (e) to an analyzer for identifying anomalies in the network for use in determining a corrective action to improve network performance, wherein the network performance is characterized by one or more of the following attributes: connectivity, throughput, responsiveness, retry percentage, coverage, signal strength, and percentage utilization of the wireless spectrum across multiple wireless technologies.

2. The method of claim 1, wherein step (a) comprises capturing a stream of RF signal data by an on-board capture device.

3. The method of claim 2, wherein step (b) is performed by a forensic data recorder, and wherein the on-board capture device streams data over a local memory bus to the forensic data recorder, wherein the stream of data is in a format mutually agreed upon between the on-board capture device and the forensic data recorder.

4. The method of claim 3, wherein the stream of data is used for offline forensic analysis and/or to troubleshoot network issues.

5. The method of claim 1, wherein step (a) comprises capturing a stream of RF signal data by an off-board capture device.

6. The method of claim 5, wherein step (b) is performed by a forensic data recorder, and wherein the off-board capture device streams data to the forensic data recorder, wherein the stream of data is in a format mutually agreed upon between the off-board capture device and the forensic data recorder.

7. The method of claim 6, wherein the stream of data is used for offline forensic analysis and/or to troubleshoot network issues.

8. The method of claim 1, wherein steps (a) to (f) are performed by an integrated device.

9. The method of claim 1, wherein steps (a) and (b) are performed by a first device, and steps (c) and (e) are performed by a different second device.

10. The method of claim 1, wherein each event of interest includes at least one of the following additional attributes: type of wireless packet, and a connection state.

11. The method of claim 1, wherein the change in the event of interest is in a structured data format and suitable for storage in a conventional relational database.

12. The method of claim 1, wherein the events of interest can comprise one or more of the following: (1) a presence_eoi containing information about presence or absence of client devices or infrastructure devices, (2) a connection_eoi containing information about the handshake between a client device and an infrastructure device, and whether the handshake was successful or not, (3) a stats_eoi including statistics about client and/or infrastructure devices over a period of time, and (4) a capability_eoi including information about capability of client devices and infrastructure devices.

13. The method of claim 1, wherein a ratio of event data to the RF signal data is less than $1/10$.

14. The method of claim 1, further comprising deleting captured RF signal data after generation of the events of interest.

15. The method of claim 1, further comprising storing captured RF signal data after generation of the events of interest.

16. The method of claim 1, wherein at least some of the events of interest comprise capability events of interest (capability_eoi) for one or more client devices and infrastructure devices, and the method further comprises periodically saving the capability events of interest.

17. The method of claim 16, further comprising comparing capability events of interest for one or more client devices and infrastructure devices with previously stored capability events of interest at a bit-by-bit level.

18. The method of claim 17, further comprising updating a local copy of the capabilities for a client device or an infrastructure device with merged capabilities from the first copy of the capabilities and newly stored capabilities.

19. The method of claim 18, further comprising updating a local copy of the capabilities for a client device or an infrastructure device as its capabilities change, and generating an event each time a change happens, and not generating an event if no change in capability is detected.

20. The method of claim 1, wherein the analyzer correlates events of interest from multiple data collectors.

21. A computer system for collecting data in a wireless network to be analyzed for optimizing network performance, said wireless network including one or more known wireless infrastructure devices providing a network service and one or more known client devices consuming a network service, the system comprising:
   one or more radios for capturing a stream of radio frequency (RF) signal data in the network for said one or more known wireless infrastructure devices and said one or more known client devices;
   at least one processor;
   memory associated with the at least one processor; and
   a program supported in the memory containing a plurality of instructions which, when executed by the at least one processor, cause the at least one processor to:
   (a) divide each stream of RF signal data by time into periodic intervals per location;
   (b) convert the divided RF signal data into events of interest, each event of interest defined by attributes including at least the time when the event happened and a unique identifier comprising a media control access (MAC) address of a known wireless infrastructure device and/or a known client device generating the event;

(c) repeat (a) and (b) a plurality of times for captured RF streams;

(d) detect a change in one of the events of interest from a known wireless infrastructure device and/or a known client device; and (e) provide the change in the event of interest detected in (d) to an analyzer for identifying anomalies in the network for use in determining a corrective action to improve network performance, wherein the network performance is characterized by one or more of the following attributes: connectivity, throughput, responsiveness, retry percentage, coverage, signal strength, and percentage utilization of the wireless spectrum across multiple wireless technologies.

22. The system of claim 21, wherein the system comprises an on-board capture device for capturing the streams of RF signal data.

23. The system of claim 22, wherein the system comprises a forensic data recorder for dividing each stream of RF signal data, and wherein the on-board capture device streams data over a local memory bus to the forensic data recorder, wherein the stream of data is in a format mutually agreed upon between the on-board capture device and the forensic data recorder.

24. The system of claim 21, wherein the system comprises an off-board capture device for capturing the streams of RF signal data.

25. The system of claim 24, wherein the system comprises a forensic data recorder for dividing each stream of RF signal data, and wherein the off-board capture device streams data to the forensic data recorder, wherein the stream of data is in a format mutually agreed upon between the off-board capture device and the forensic data recorder.

\* \* \* \* \*